United States Patent [19]
Oguchi et al.

[11] Patent Number: 6,042,401
[45] Date of Patent: Mar. 28, 2000

[54] CONNECTOR DEVICE FOR IC CARD

[75] Inventors: Wataru Oguchi; Hidehiro Nakamura; Kazuki Satou, all of Miyagi-ken, Japan

[73] Assignee: Alps Electric Co., Ltd., Tokyo, Japan

[21] Appl. No.: 09/088,752

[22] Filed: Jun. 2, 1998

[30]    Foreign Application Priority Data

Jun. 2, 1997  [JP]  Japan ................................ 9-144061
Jan. 5, 1998  [JP]  Japan ............................... 10-000341

[51] Int. Cl.$^7$ .................................................. H01R 13/62
[52] U.S. Cl. ........................................ 439/159; 439/160
[58] Field of Search .................................. 439/159, 157, 439/155, 152, 160, 372

[56]                References Cited

U.S. PATENT DOCUMENTS

| | | | |
|---|---|---|---|
| 5,499,925 | 3/1996 | Lwee ........................................ | 439/157 |
| 5,653,603 | 8/1997 | Sasao et al. ............................. | 439/159 |
| 5,683,258 | 11/1997 | Takano et al. ........................... | 439/159 |
| 5,707,245 | 1/1998 | Yamamoto et al. ...................... | 439/159 |
| 5,791,920 | 8/1998 | Tomioka et al. ......................... | 439/159 |
| 5,795,190 | 8/1998 | Ono ......................................... | 439/607 |
| 5,871,365 | 2/1999 | Kajiura ..................................... | 439/159 |

*Primary Examiner*—Lincoln Donovan
*Assistant Examiner*—Antoine Ngandjui
*Attorney, Agent, or Firm*—Brinks Hofer Gilson & Lione

[57]                ABSTRACT

A push rod 4 is held on an outside surface of one side of frame 3 guiding draw and insert of the IC card 1 so that the push rod 4 can reciprocally move, and this push rod 4 is always pressed to the drawn direction of the IC card 1 by a coil spring 10. A transfer pin 12 is rotatably supported by a hole 4c of the push rod 4, and this transfer pin 12 is pressed toward the outside surface of the frame 3 by a flat spring 13. A heart-shaped cam groove 14 having a plurality of cam surfaces A to E is engraved, and an operating section 12a formed at an end of the transfer pin 12 is engaged with this cam groove 14. In addition, a drive plate 15 is held on the outside surface of the frame 3 so that the drive plate 15 can reciprocate along the draw and insert directions of the IC card 1, and a receiving section 15a of this drive plate 15 is inserted into the long groove 3c continuing to the cam surface D of the cam groove 14.

6 Claims, 6 Drawing Sheets

CONNECTOR DEVICE FOR IC CARD

BACKGROUND OF THE INVENTION

1. Field of the Invention

The present invention relates to a connector device provided in equipment used by drawing and inserting an IC card, and in particular, to an eject mechanism for discharging an IC card that is inserted.

2. Description of the Related Art

Usually, connector devices each are schematically constructed with a pin header section where multiple pin contacts for connecting to socket contacts in an IC card are located in a pin housing, a frame guiding the IC card at the time of draw and insert, an eject mechanism for discharging from the pin contacts the IC card that is inserted, and the like, and connector devices where a pin housing and a frame are molded in one piece are also well-known.

Hitherto, the connector devices widely adopted are those that are constructed with a push rod that is held on the external side of the frame so that reciprocation motion along the direction of drawing and inserting the IC card can be performed, and an eject bar rotatably supported on the frame or the pin housing, and in which an end of the eject lever is engaged with the push rod. A connector device providing such an eject mechanism has a disadvantage that, if the push rod is pushed in when the IC card is inserted, the IC card can be easily drawn with fingers by a hook section of the eject lever, rotating with interlocking with this push rod, pushing the IC card to the near side, but since the push rod projects to the near side, the push rod is erroneously operated against user's intention during the time of connecting the IC card.

Against this, a connector device disclosed in Japanese Unexamined Utility Model Publication No. 6-13072 comprises first and second transfer levers performing link connection between a push rod and a slide plate, a third transfer lever attachable to and detachable from the second transfer lever pivoted by the first transfer lever, and a heart-shaped cam mechanism that can lock the push rod at pushed-in and projecting positions. Further, the connector device is constructed so that a pushing force may be selectively transferred to the slide plate according to a projection amount of the push rod. Thus, in inserting the IC card, although the third transfer lever does not engage with the second transfer lever and the push rod is at the pushed-in position, if the push rod is further pulled to the near side after projecting the push rod by the projecting position by the heart-shaped cam mechanism, the third transfer lever engages with the second transfer lever at the position. Hence, if the push rod is pressed toward the pushed-in position in this state, the pushing force is transferred to the slide plate through each transfer lever, and the slide plate pushes the IC card to the near side. Therefore, it is possible to prevent misoperation of the push rod by the push rod being locked at the pushed-in position when the IC card is inserted and being projected only when the IC card is discharged.

In this manner, according to the connector device disclosed in the above-mentioned publication, since the push rod can be locked at the pushed-in position during the time of connecting the IC card, it is possible to prevent misoperation of the push rod against user's intention. However, since the pushing force of the push rod is selectively transferred to the slide plate in dependence on postures of the three transfer levers link-connected, this connector device has a problem that such a transfer mechanism becomes complicated and workability in assembling is lowered.

SUMMARY OF THE INVENTION

The connector device of the present invention has a frame, insertably supporting an IC card, and a push rod capable of reciprocation between a pushed-in position and a projecting position, the connector device where the push rod is at the pushed-in position during the time of inserting the IC card, the push rod moves to the projecting position by a first push operation of the push rod in this state, and the IC card is discharged by a second push operation of the push rod at this projecting position, the connector device comprising a heart-shaped cam groove, a transfer pin that is attached to the push rod and moves along the heart-shaped cam groove, a movable drive plate, and an eject arm, wherein the drive plate is moved by the transfer pin contacting the drive plate during the moving process of the push rod at the projecting position to the pushed-in position that is caused by the second push operation during the time of inserting the IC card, and the IC card is discharged by driving the eject arm by the drive plate. By means of construction like this, it is possible to simplify a pushing force transfer mechanism between the push rod and eject arm and to increase the workability in assembling because it is possible to operate the drive plate and eject arm with using movement of the transfer pin tracing the inside of the heart-shaped cam groove.

Furthermore, in the above-mentioned construction, if the connector device has the construction of that a long groove guiding the drive plate is formed in the frame, this long groove and the heart-shaped cam groove are serially provided, the drive plate projects inside a moving area of the transfer pin, and the eject arm is driven with a reciprocating motion of the drive plate, the drive plate is at the position inside the moving area of the transfer pin at the time of inserting the IC card, the drive plate is not driven by the transfer pin at the time of the first push operation of the push rod, the drive plate is moved by the transfer pin contacting to the drive plate through the second push operation in the state that the push rod is at the projecting position, it is possible to securely contact the transfer pin with the drive plate.

Moreover, in the above construction, if a flat spring is provided between the push rod and transfer pin, an end of the transfer pin is inserted into a hole of the flat spring and a hole of the push rod, and the push rod is sandwiched at a folded portion provided in the flat spring, it is possible not only to securely engage the transfer pin with a cam surface of the heart-shaped cam groove by a flat spring, but also to easily attach the flat spring on the push rod.

Furthermore, the connector device of the present invention is a connector device that has a frame, insertably supporting an IC card, and a push rod capable of reciprocation at a pushed-in position and a projecting position, and discharges the IC card, the connector device wherein a movement guide portion for the IC card is provided inside the frame, a heart-shaped cam groove is provided outside the frame facing to this movement guide portion, and the push rod is driven along the heart-shaped cam groove. By providing the movement guide portion for the IC card and the heart-shaped cam groove separately in both sides of the internal and external sides of the frame like this, it is possible to realize miniaturization.

In addition, the present invention can be also applied to a connector device corresponding to a single card. However, the present invention is more effective in case the present invention is applied to a connector device that corresponds to a plurality of cards and has a plurality of movement guide portions inside the frame, guiding a plurality of IC cards, and push rods outside the frame, separately discharging the IC cards.

The present invention has advantages as described below.

In a connector device that has a frame, insertably supporting an IC card, and a push rod capable of reciprocation between a pushed-in position and a projecting position, the connector device where the push rod is at the pushed-in position during the time of inserting the IC card, the push rod moves to the projecting position by a first push operation of the push rod in this state, and the IC card is discharged by a second push operation of the push rod at this projecting position, if the connector device comprises a heart-shaped cam groove, a transfer pin that is attached to the push rod and moves along the heart-shaped cam groove, a movable drive plate, and an eject arm and is constructed so that the drive plate may be moved by the transfer pin contacting the drive plate during the moving process of the push rod at the projecting position to the pushed-in position that is caused by the second push operation during the time of inserting the IC card, and the IC card may be discharged by driving the eject arm by the drive plate, it is possible to simplify a pushing force transfer mechanism between the push rod and eject arm and to increase the workability in assembling because it is possible to operate the drive plate and eject arm with using movement of the transfer pin tracing the inside of the heart-shaped cam groove.

Furthermore, if the connector device has the construction of that a long groove guiding the drive plate is formed in the frame, this long groove and the heart-shaped cam groove is serially provided, the drive plate projects inside a moving area of the transfer pin, and the eject arm is driven with a reciprocating motion of the drive plate, the drive plate becomes at the position inside the moving area of the transfer pin at the time of inserting the IC card, the drive plate is not driven by the transfer pin at the time of the first push operation of the push rod, the drive plate is moved by the transfer pin contacting to the drive plate through the second push operation in the state that the push rod is at the projecting position, it is possible to securely contact the transfer pin with the drive plate.

Moreover, if a flat spring is provided between the push rod and transfer pin, an end of the transfer pin is inserted into a hole of the flat spring and a hole of the push rod, and the push rod is sandwiched at a folded portion provided in the flat spring, it is possible not only to securely engage the transfer pin with a cam surface of the heart-shaped cam groove by the flat spring, but also to easily attach the flat spring on the push rod.

Furthermore, in the connector device that has a frame, insertably supporting an IC card, and a push rod capable of reciprocation between a pushed-in position and a projecting position, the connector device discharging the IC card by push operation of the push rod, if the connector device is constructed so that a movement guide portion for the IC card may be provided inside the frame, a heart-shaped cam groove may be provided outside the frame facing to this movement guide portion, and the push rod may be driven along the heart-shaped cam groove, it is possible to realize miniaturization by providing the movement guide portion for the IC card and the heart-shaped cam groove separately in both sides of the internal and external sides of the common frame.

DESCRIPTION OF THE PREFERRED EMBODIMENT

Figure 1:
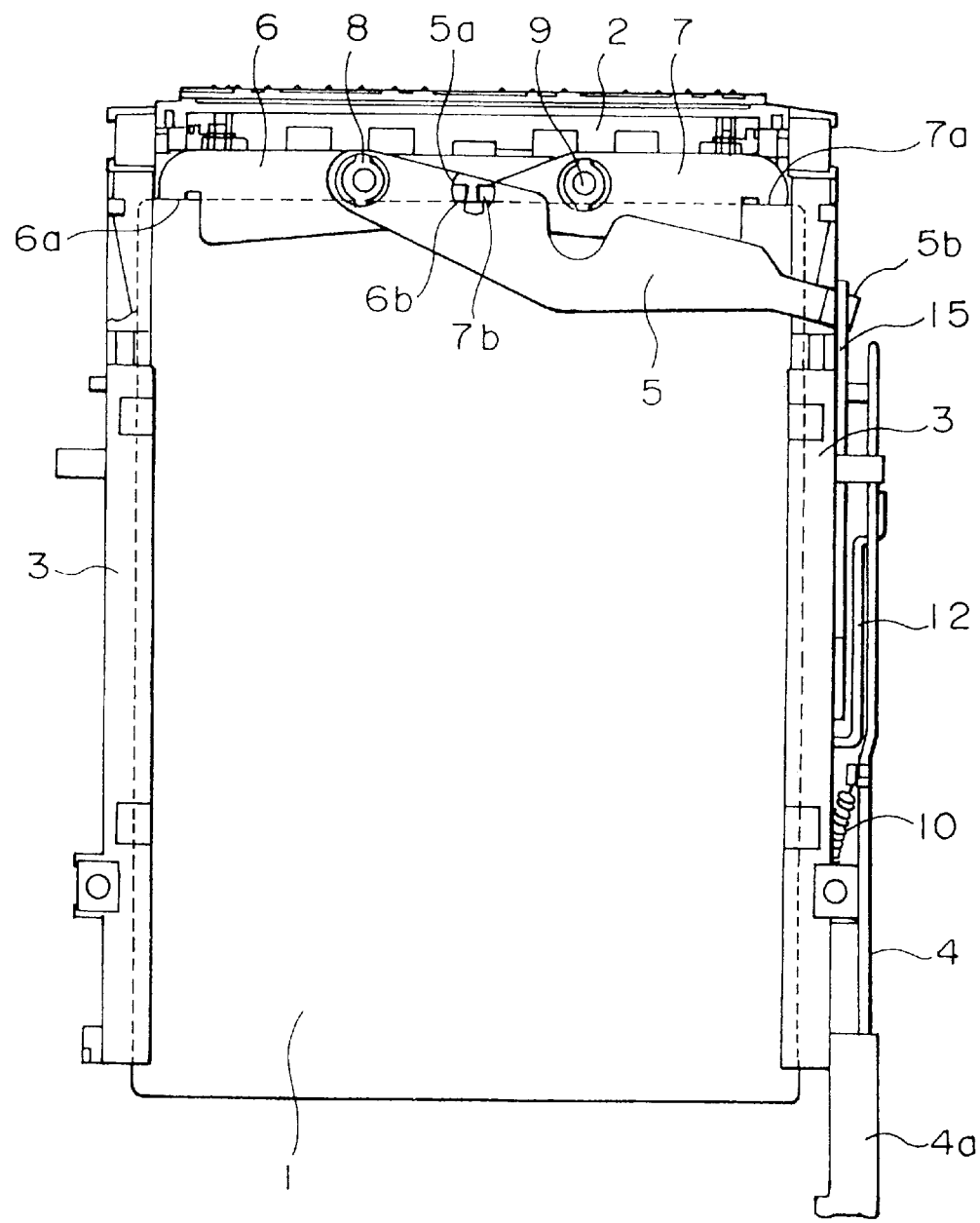
FIG. 1 is a top view showing a state of inserting an IC card into a connector device according to an embodiment of the present invention.
Figure 2:
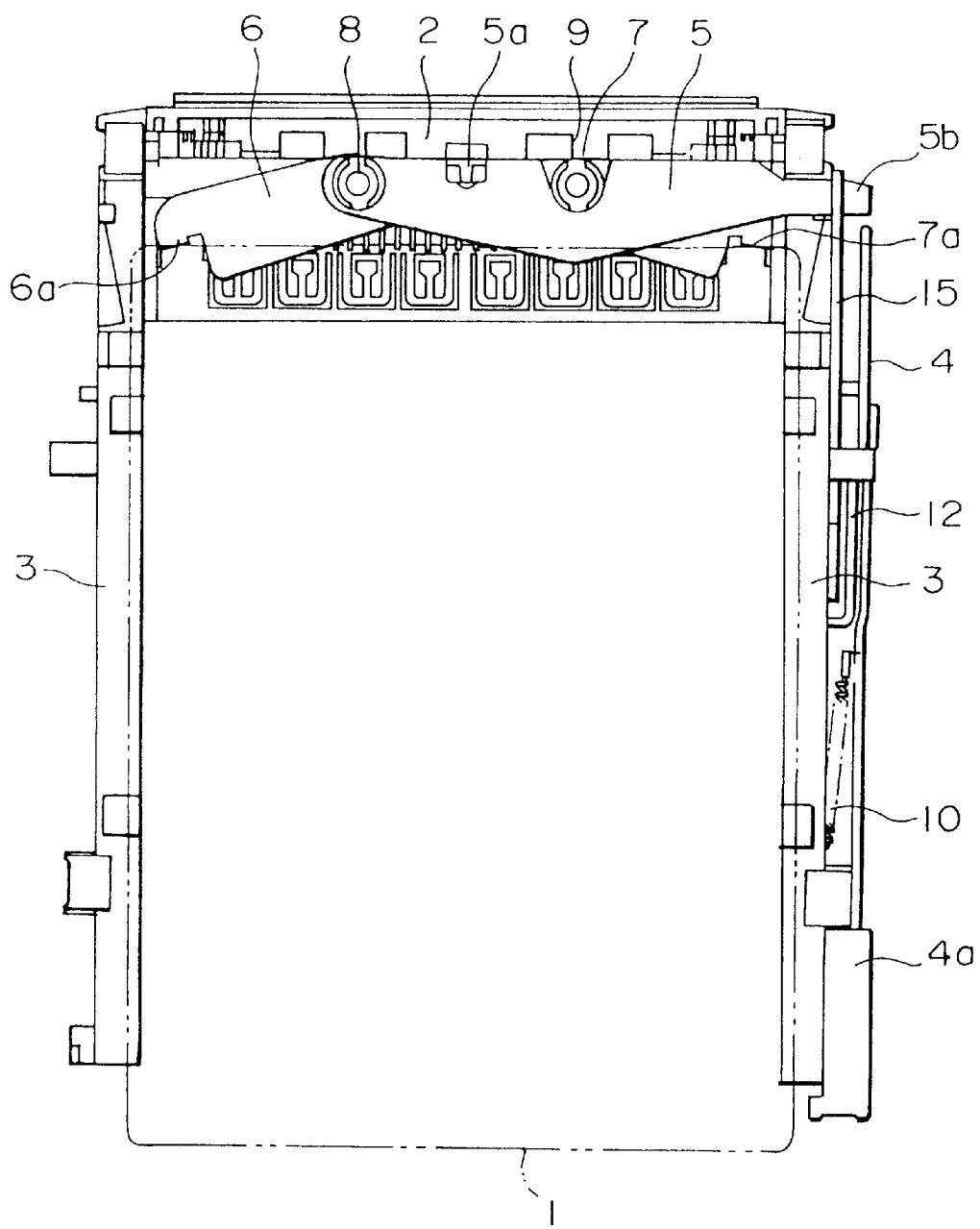
FIG. 2 is a top view showing a state of being just after detaching an IC card from the connector device.
Figure 3:
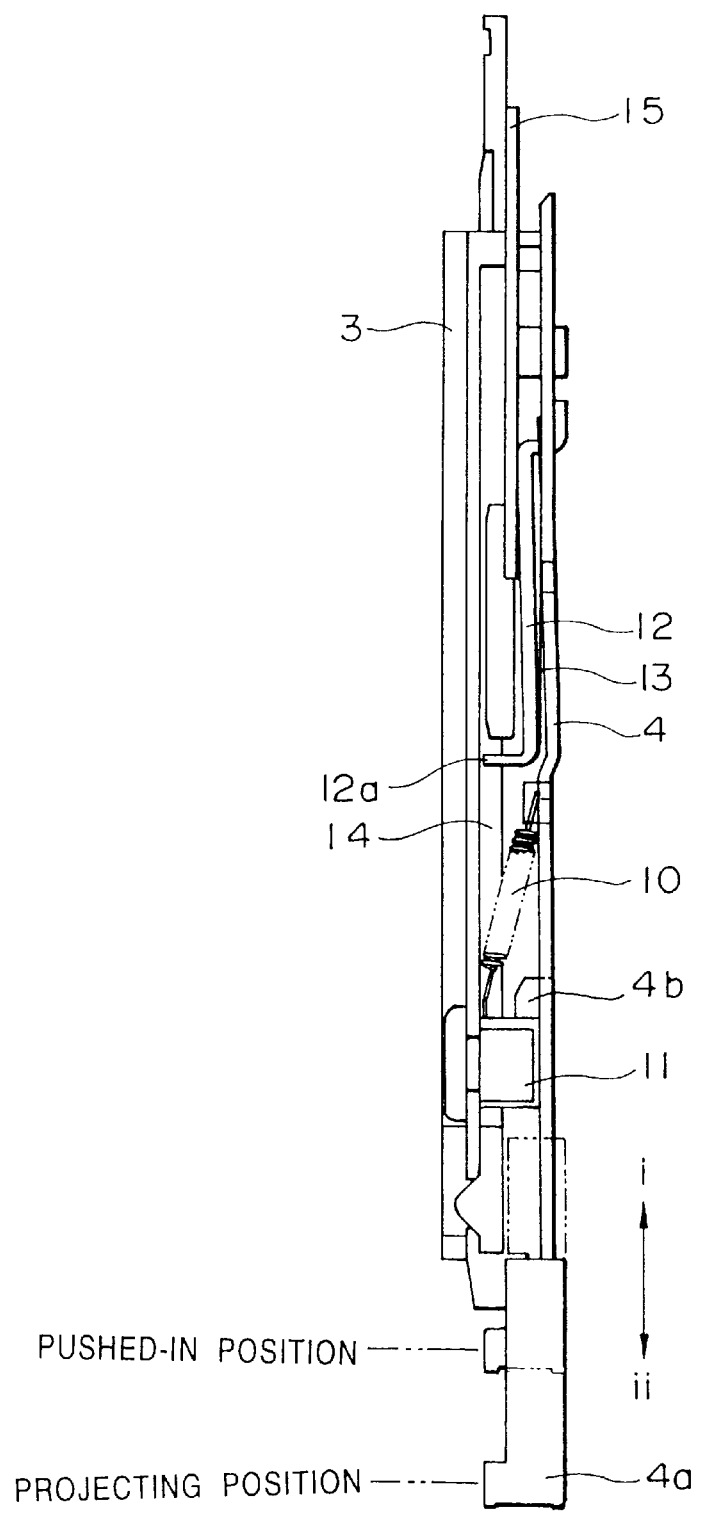
FIG. 3 is a top view of an eject mechanism provided in the connector device.
Figure 4:
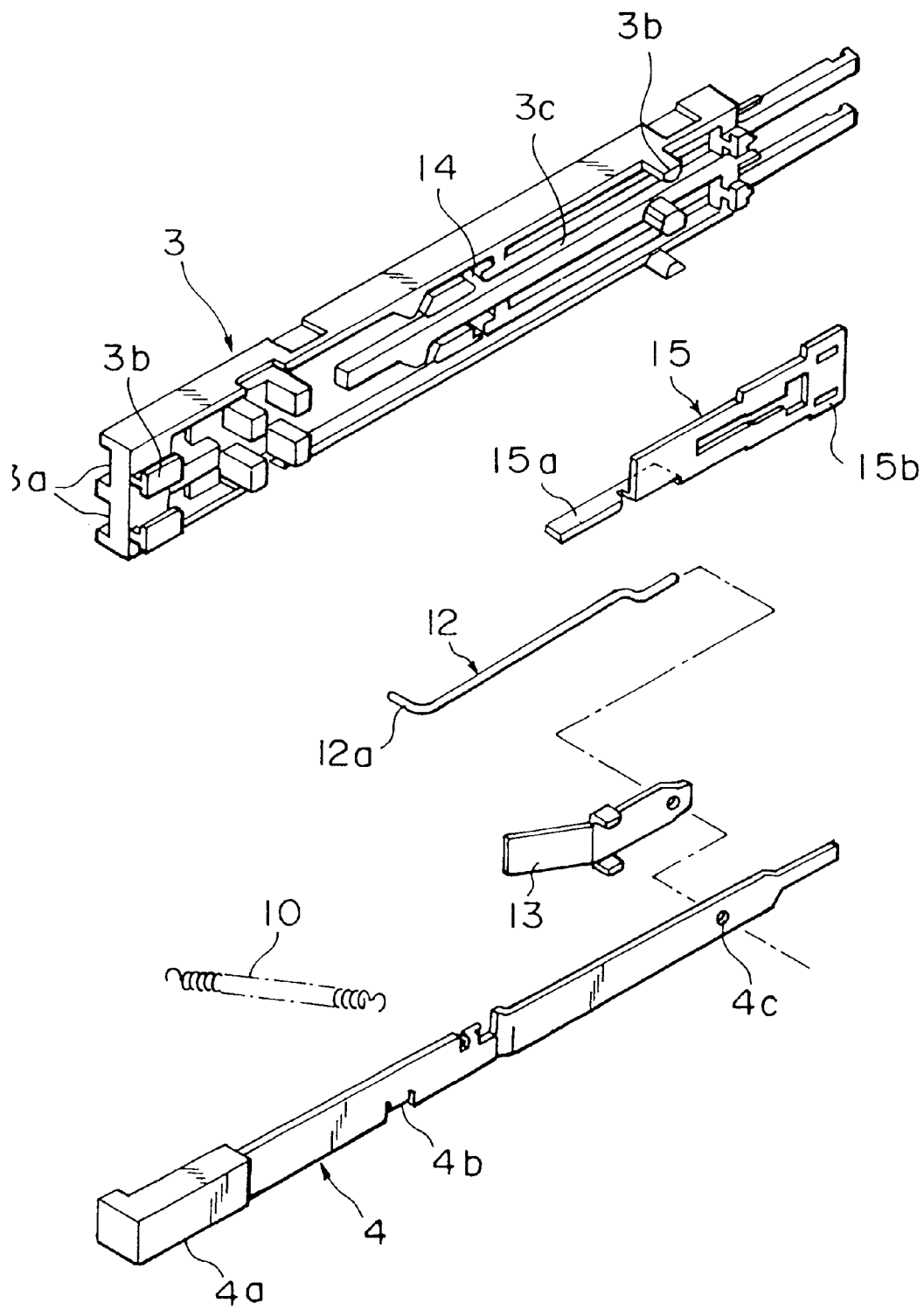
FIG. 4 is an exploded schematic diagram of the eject mechanism.
Figure 5:
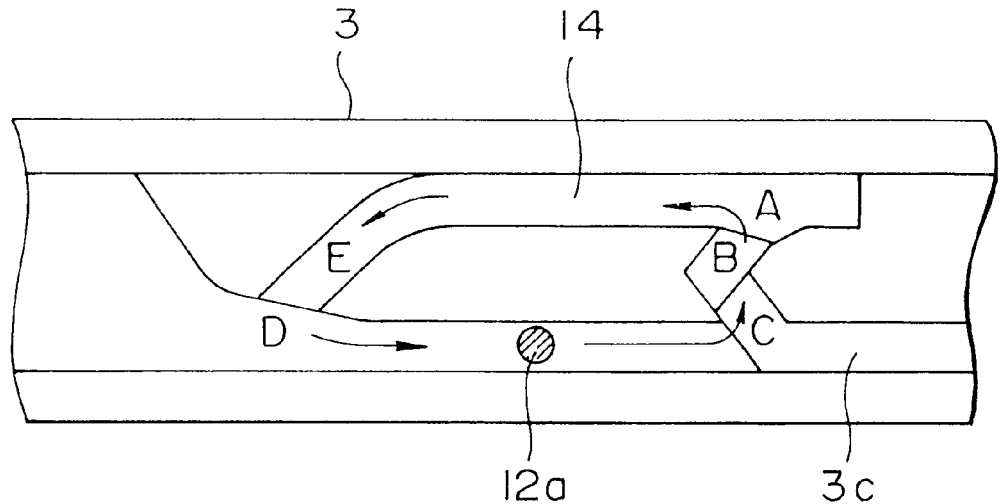
FIG. 5 is an explanatory diagram of a heart-shaped cam groove.
Figure 6:
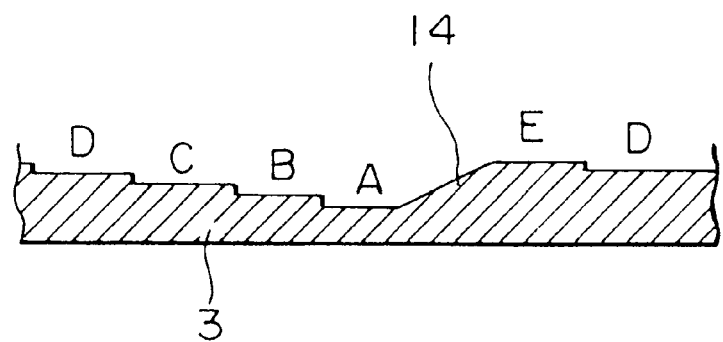
FIG. 6 is a development showing a cam surface of the heart-shaped cam groove.

With an embodiment being described with reference to drawings, FIG. 1 is a top view showing a state of inserting an IC card into a connector device according to an embodiment, FIG. 2 is a top view showing a state of being just after the IC card is detached from the connector device, and FIG. 3 is a top view of an eject mechanism. Further, FIG. 4 is an exploded schematic diagram of the eject mechanism, FIG. 5 is an explanatory diagram of a heart-shaped cam groove, FIG. 6 is a development showing a cam surface of the heart-shaped cam groove, and FIG. 7 is an explanatory drawing of operation of the eject mechanism.

As shown in FIGS. 1 and 2, the connector device for IC cards according to the embodiment are mainly composed of: a pin housing 2 press-fitting and fixing multiple pin contacts for connecting to socket contacts (any of them are not shown) in the IC card 1, in predetermined arrangement; a pair of frames 3 that is fixed on left and right sides of the housing 2 and guides the IC card from both sides in the cross direction; a push rod 4 attached to one of frames 3; and an eject arm 5, first and second rotation arm 6 and 7 that are pivoted by the pin housing 2, an eject mechanism which is provided between the push rod 4 and the eject arm 5 and will be described later.

In the pin housing 2, a first spindle 8 and a second spindle 9 are provided at a predetermined gap, and an end of the eject arm 5 is rotatably supported by the first spindle 8. In this eject arm, a communication hole 5a and an engaging section 5b are formed, and the engaging section 5b projects to the outside of the frame 3. The first rotation arm 6 is also rotatably supported by the spindle 8, and a catch piece 6a for pushing out the IC card and a tongue piece 6b projecting inside the communication hole 5a of the eject arm 5 are formed. The second rotation arm 7 is rotatably supported by the second spindle 9, and a catch piece 7a for pushing out the IC card and a tongue piece 7b projecting inside the communication hole 5a of the eject arm 5 are formed.

With construction of the eject mechanism being described in detail with reference to FIGS. 3 to 6, although the connector device shown in the embodiment can accept two IC cards 1 along guide grooves 3a that have two step construction, that is, an upper step and a lower step and are formed on inside surfaces of both frames 3, and comprises two push rods 4 that discharging these two IC cards, functions and construction of both push rods 4 are fundamentally the same, and hence, one side of push rod 4 and its eject mechanism will be described below (FIG. 4 also shows only one side of push rod and eject mechanism).

The push rod 4 has a handle 4a at one end, and is held so that the push rod 4 can reciprocally move along the draw and insert directions (arrows i and ii in FIG. 3) of the IC card 1 by a projecting section 3b provided on an outside surface of one side of frame 3. Although the push rod 4 is always pressed to the draw direction (an arrow i in FIG. 3) of the IC card 1 by a coil spring 10, a moving amount to the direction is restricted at the projecting position in FIG. 3 by the stopper piece 4b contacting with a mounting bracket 11 fixed on the frame 3. An end of a transfer pin 12 having an L-shaped operating section 12a at another end is rotatably supported by a hole 4c of the push rod 4, and this transfer pin 12 is pressed toward the outside surface of the frame 3 by the flat spring 13 engaged on the push rod 4.

A heart-shaped cam groove 14 is provided in the outside surface of the frame 3, and an operating section 12a of the transfer pin 12 engages with this cam groove 14. As shown in FIGS. 5 and 6, this cam groove 14 has a plurality of cam surfaces A to E whose heights are different, and the operating section 12a of the transfer pin 12 traces these cam surfaces A to E to the direction shown by arrows in FIG. 5. In addition, a drive plate 15 is held on the outside surface of the frame 3 so that the drive plate 15 can reciprocate along the draw and insert directions of the IC card 1, and a receiving section 15a folded in this drive plate 15 is inserted into the long groove 3c engraved in the outside surface of the frame 3. This long groove 3c and the cam surface D of the cam groove 14 are linearly connected, and the receiving section 15a of the drive plate 15 reciprocates between this long groove 3c and cam surface D. Further, an engaging hole 15b is provided in the drive plate 15, and the engaging section 5b of the eject arm 5 passes through the frame 3 and engages with the engaging hole 15b of the drive plate 15.

Figure 7A:
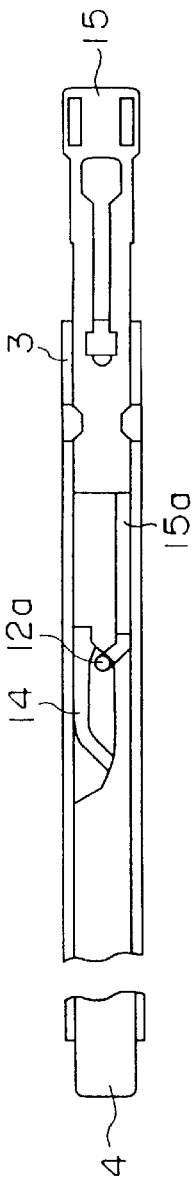
FIG. 7 is an explanatory diagram of operation of the eject mechanism in FIG. 3.

In the connector device constructed like this, if the IC card 1 is not inserted, the push rod 4 is pushed to the direction shown by an arrow i in FIG. 3 and is held at the pushed-in position in the figure. In this time, as shown in FIG. 7A, the operating section 12a of the transfer pin 12 engages with the cam surface B of the cam groove 14, and the push rod 4 is stably held at the pushed-in position by a tensile force of the coil spring 10 and the transfer pin 12 engaged with the cam surface B.

Figure 7B:
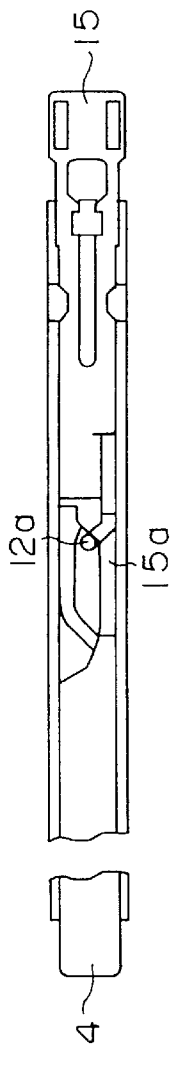

As the IC card 1 is inserted along the guide groove 3a of the frame 3, the IC card is pressing pin contacts of the pin housing 2 into its own socket contacts as the IC card 1 going to the pin housing 2 presses the catch pieces 6a and 7a of the first and second rotation arms 6 and 7, and hence, the IC card 1 becomes in a complete insertion state in which the IC card surely contacts to respective pin contacts by inserting the IC card by a predetermined amount. In that time, since the first rotation arm 6 and second rotation arm 7 rotate in mutually reverse directions with using the first spindle and second spindle 9 as rotation shafts, and rotation of these rotation arms 6 and 7 is transferred to the eject arm 5 via a link portion of the tongue piece 6b and 7b and the communication hole 5a, the eject arm 5 rotates about the first spindle 8 as a rotation shaft, and the drive plate 15 moves to the front of the frame 3 with interlocking with that. Owing to this, as shown in FIG. 7B, although the receiving section 15a of the drive plate 15 moves from the long groove 3c to the cam surface D of the cam groove 14, the operating section 12a of the transfer pin 12 engages with the cam surface B. Hence, the receiving section 15a does not contact to the operating section 12a, and therefore, it is kept for the push rod 4 to be held at the pushed-in position during the IC card being inserted.

Figure 7C:
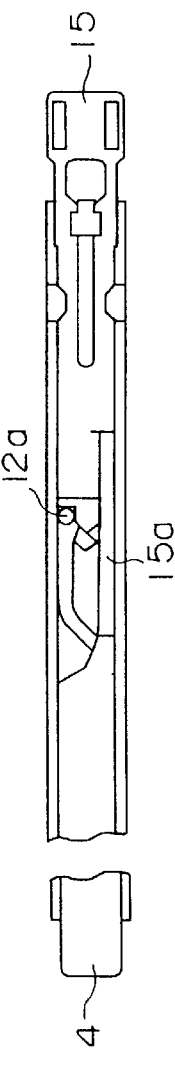
Figure 7D:
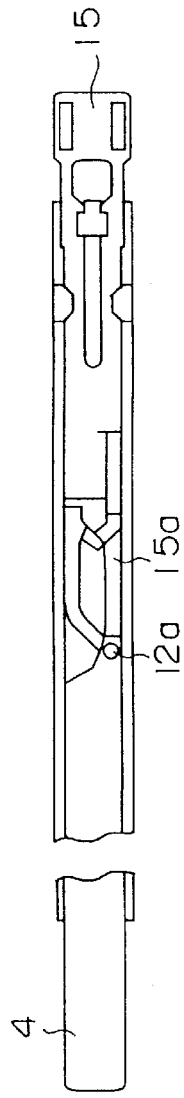

Against this, in case the IC card is discharged from the connector device, first, the push rod 4 held at the pushed-in position is pushed forward, and, as shown in FIG. 1, the handle 4a of the push rod 4 is projected at the projecting position. In this case, if the push rod 4 at the pushed-in position is pushed to the direction shown by an arrow i in FIG. 3, as shown in FIG. 7C, the operating section 12a of the transfer pin 12 moves to the cam surface B of the cam groove 14 to the cam surface A, and moves from the cam surface A to the cam surface D through the cam surface E by the tensile force of the coil spring 10, and hence, as shown in FIG. 7D, the push rod 4 moves to the direction shown by an arrow ii in FIG. 3, and projects to the projecting position. Also in this time, since the operating section 12a of the transfer pin 12 does not contact to the receiving section 15a of the drive plate 15, the operating section 12a faces the receiving section 15a in the cam surface D if the push rod 4 moves to the projecting position.

Figure 7E:
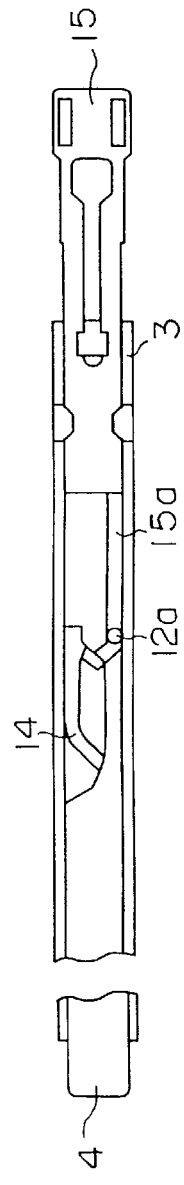

If the handle 4a of the push rod 4 is pushed to the direction shown by the arrow i in FIG. 3 after the push rod 4 is projected to the projecting position, as shown in FIG. 7E, the operating section 12a of the transfer pin 12 is engaged with the cam surface B from the cam surface D of the cam groove 14 through the cam surface C. Hence, the push rod 4 is held again at the pushed-in position. In that time, since the operating section 12a contact to and press the receiving section 15a of the drive plate 15 during the process in which the operating section 12a of the transfer pin 12 moves from the cam surface D, the eject arm 5 engaged by the drive plate 15 rotates, and the catch pieces 6a and 7a of the first and second rotation arms 6 and 7 press both ends of the front of the IC card 1 nearly to the discharged direction, as shown by a two-dot chain line in FIG. 2, the press fit of the socket contacts of the IC card 1 and the pin contacts of the pin housing 2 is released. Hence, it is possible to easily discharge the IC card 1 from the connector device by picking the front of the IC card 1 between fingers in this state and drawing it.

In addition, in the above-mentioned embodiment, the connector device in which two IC cards can be inserted is exemplified and described, but the present invention can be similarly applied to a connector device in which one, three, or more IC card(s) can be inserted.

What is claimed is:

1. A connector device that has a frame, insertably supporting an IC card, and a push rod capable of reciprocation between a pushed-in position and a projecting position, the connector device where the push rod is at the pushed-in position during the time of inserting the IC card, the push rod moves to the projecting position by a first push operation of the push rod in this state, and the IC card is discharged by a second push operation of the push rod at this projecting position, the connector device comprising: an eject arm for discharging said IC card; a heart-shaped cam groove; a transfer pin that is attached to said push rod and moves along the heart-shaped cam groove in accordance with a reciprocating motion of said push rod; a drive plate that is capable of reciprocation and drives said eject arm in accordance with a reciprocating motion thereof; and a construction of that a long groove guiding said drive plate is formed in said frame, this long groove and said heart-shaped cam groove are serially provided and said drive plate projects inside a moving area of said transfer pin wherein said drive plate is at the position inside the moving area of said transfer pin at the time of inserting the IC card, said drive plate is not pushed by said transfer pin through the first push operation of said push rod, and said drive plate is moved by said transfer pin contacting to said drive plate through the second push operation of said push rod, whereby said eject arm is driven to discharge said IC card.

2. The connector device according to claim 1, wherein a flat spring is provided between said push rod and said transfer pin, an end of said transfer pin is inserted into a hole of said flat spring and a hole of said push rod, and said push rod is sandwiched at a folded portion provided in said flat spring.

3. The connector device according to claim 1, wherein a plurality of movement guide portions guiding a plurality of IC cards respectively is provided inside said frame, and push rods discharging said IC cards separately are provided outside said frame.

4. The connector device according to claim 1, wherein the heart-shaped cam groove has a difference in height that is formed in a moving direction of the transfer pin.

5. A connector device that has a frame, insertably supporting an IC card, and a push rod having a transfer pin and capable of reciprocation between a pushed-in position and a projecting position, and discharges the IC card by driving an eject arm with a push operation of the push rod, wherein a movement guide portion for guiding the movement of the IC card in an insertion direction and a discharge direction is provided inside said frame, a heat-shaped cam groove is provided outside the frame facing to this movement guide portion, and the push rod is reciprocated between the pushed-in position and the projecting position using this heart-shaped cam groove, wherein the transfer pin moves along the heart-shaped cam grove.

6. The connector device according to claim 5, wherein a plurality of movement guide portions guiding a plurality of IC cards respectively is provided inside said frame, and push rods discharging said IC cards separately is provided outside the frame.

* * * * *